US008445582B2

(12) United States Patent
Yasui et al.

(10) Patent No.: US 8,445,582 B2
(45) Date of Patent: May 21, 2013

(54) ADHESIVE AND MULTILAYER STRUCTURE HAVING THE SAME

(75) Inventors: Shigeyuki Yasui, Rye Brook, NY (US); Setsuko Funaki, Ichihara (JP); Yuichiro Terashi, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 33 days.

(21) Appl. No.: 12/525,275

(22) PCT Filed: Jan. 31, 2008

(86) PCT No.: PCT/JP2008/051574
§ 371 (c)(1),
(2), (4) Date: Jul. 30, 2009

(87) PCT Pub. No.: WO2008/093805
PCT Pub. Date: Aug. 7, 2008

(65) Prior Publication Data
US 2010/0063198 A1    Mar. 11, 2010

(30) Foreign Application Priority Data

Feb. 2, 2007    (JP) ................................ 2007-024480

(51) Int. Cl.
*C08L 33/00* (2006.01)
*C08L 33/02* (2006.01)

(52) U.S. Cl.
USPC .......................................... 524/522; 525/221

(58) Field of Classification Search
USPC ....................................................... 524/522
See application file for complete search history.

(56) References Cited

U.S. PATENT DOCUMENTS

| | | | |
|---|---|---|---|
| 5,296,552 A | | 3/1994 | Ohmae et al. |
| 5,695,838 A | * | 12/1997 | Tanaka et al. ................. 428/35.2 |
| 6,183,863 B1 | * | 2/2001 | Kawachi et al. ......... 428/355 AC |
| 2007/0245929 A1 | * | 10/2007 | Asami et al. ............. 106/287.18 |

FOREIGN PATENT DOCUMENTS

| | | |
|---|---|---|
| EP | 0 501 762 B1 | 12/1995 |
| EP | 0 758 675 B1 | 1/2001 |
| EP | 0 791 628 B1 | 11/2001 |
| EP | 1 632 532 A1 | 3/2006 |
| EP | 1 978 070 A1 | 10/2008 |
| JP | 4-272950 A | 9/1992 |
| JP | 4-300933 A | 10/1992 |
| JP | 4-363372 A | 12/1992 |
| JP | 9-87603 A | 3/1997 |
| JP | 9-111069 A | 4/1997 |
| JP | 10-286912 A | 10/1998 |
| JP | 2001-279155 | 10/2001 |
| JP | 2001-311036 A | 11/2001 |
| JP | 2003-226853 A | 8/2003 |
| JP | 2004-35626 A | 2/2004 |
| JP | 2005-263997 A | 9/2005 |
| JP | 2006-63123 A | 3/2006 |
| WO | WO 2004-101679 A1 | 11/2004 |

OTHER PUBLICATIONS

International Search Report issued by the Japanese Patent Office on Apr. 1, 2008 concerning International Application No. PCT/JP2008/051574 (2 pps.).

Communication (Supplementary EP Search Report) in EP Appln No: 08 71 0672 dated Feb. 15, 2011.

* cited by examiner

*Primary Examiner* — Hui Chin
(74) *Attorney, Agent, or Firm* — Foley & Lardner LLP

(57) ABSTRACT

It is an object of the invention to provide polypropylene adhesives which have excellent adhesion to polar materials and exhibit particularly excellent adhesion after high-speed cast film processing, stretching or extrusion coating, and are excellent in blushing resistance, and multilayer structures having the adhesives. The adhesive resin composition is a grafted resin composition comprising a polypropylene component (A), an ethylene/propylene/α-olefin copolymer component (B), an ethylene/α-olefin copolymer component (C), and an unsaturated carboxylic acid and/or a derivative thereof (D), and which contains the component (A) at 5 to 80 parts by mass, the component (B) at 5 to 70 parts by mass and the component (C) at 1 to 40 parts by mass based on 100 parts by mass of the components (A), (B) and (C) combined and has an ethylene/propylene/α-olefin ratio in n-decane-soluble components of 5-95/5-95/1-50 mol % and a graft ratio of 0.01 to 5 wt %.

13 Claims, No Drawings

ADHESIVE AND MULTILAYER STRUCTURE HAVING THE SAME

FIELD OF THE INVENTION

The present invention relates to novel adhesives and multilayer structures having the adhesives. In detail, the invention relates to polypropylene adhesives which have excellent adhesion to polar materials and exhibit particularly excellent adhesion after high-speed cast film processing, stretching or extrusion coating and which are excellent in blushing resistance, and to multilayer structures having the adhesives.

BACKGROUND OF THE INVENTION

Polypropylenes have been used widely as thermoplastic molding materials with high rigidity, heat resistance, transparency and the like. Because the polypropylenes are nonpolar materials, they show poor adhesion to polar materials such as ethylene/vinyl alcohol copolymers. To improve adhesion, it is generally known that the polypropylenes are modified with unsaturated carboxylic acids or derivatives thereof. Further, the polypropylenes have low flexibility. Therefore, the use of the polypropylenes as adhesives generally involves addition of soft rubber components. Adding soft rubber components to the polypropylenes results in polypropylene adhesives improved in adhesion (Patent Documents 1 and 2). However, such adhesives as disclosed in Patent Documents 1 and 2 cannot achieve high adhesion in multilayer structures produced by techniques such as high-speed cast film processing, stretching and extrusion coating. Accordingly, improvements in adhesion have been desired. Furthermore, the soft rubber components as described in Patent Documents 1 and 2 can cause blushing in secondary processing such as deep drawing, and therefore improved blushing resistance has also been desired.

Patent Document 1: JP-A-H09-111069
Patent Document 2: JP-A-H04-300933

SUMMARY OF THE INVENTION

It is an object of the invention to provide polypropylene adhesives which have excellent adhesion to polar materials and exhibit particularly excellent adhesion after high-speed cast film processing, stretching or extrusion coating and which are excellent in blushing resistance, and multilayer structures having the adhesives.

The present inventors studied diligently to achieve the above object and have completed the present invention. The present invention is directed to an adhesive resin composition which is a grafted resin composition comprising a polypropylene component (A), an ethylene/propylene/α-olefin copolymer component (B), an ethylene/α-olefin copolymer component (C), and an unsaturated carboxylic acid and/or a derivative thereof (D), and which contains the component (A) at 5 to 80 parts by mass, the component (B) at 5 to 70 parts by mass and the component (C) at 1 to 40 parts by mass based on 100 parts by mass of the components (A), (B) and (C) combined and which has an ethylene/propylene/α-olefin ratio in n-decane-soluble components of 5-95/5-95/1-50 mol % and a graft ratio of 0.01 to 5 wt %. The invention is also directed to a multilayer structure having at least one adhesive layer comprising the adhesive resin composition.

ADVANTAGES OF THE INVENTION

The adhesive resin compositions according to the present invention can provide multilayer structures in which the adhesive resin compositions are firmly bonded to polar materials. Further, multilayer structures having excellent adhesion properties can be obtained even by high-speed cast film processing, stretching or extrusion coating. Furthermore, the multilayer structures are not blushed by secondary processing such as deep drawing.

PREFERRED EMBODIMENTS OF THE INVENTION

The present invention will be described in detail hereinbelow.

The polypropylene adhesives according to the present invention are grafted resin compositions which comprise a polypropylene component (A), an ethylene/propylene/α-olefin copolymer component (B), an ethylene/α-olefin copolymer component (C), and an unsaturated carboxylic acid and/or a derivative thereof (D). The compositions contain the component (A) at 5 to 80 parts by mass, the component (B) at 5 to 70 parts by mass and the component (C) at 1 to 40 parts by mass based on 100 parts by mass of the components (A), (B) and (C) combined, and have an ethylene/propylene/α-olefin ratio in n-decane-soluble components of 5-95/5-95/1-50 mol % and a graft ratio of 0.01 to 5 wt %.

The components will be described below.

(A) Polypropylenes

The polypropylene component (A) used in the invention is propylene homopolymer and/or propylene/α-olefin copolymer.

The α-olefins are not particularly limited. Preferred examples thereof include C2 ethylene and/or C4-20 α-olefins. The α-olefins may be used singly, or two or more kinds may be used in combination. In the invention, C2 ethylene or a C4-10 α-olefin may be suitably used, and particularly C2 ethylene or a C4-8 α-olefin may be suitably used. In the propylene/α-olefin copolymers, the content of propylene-derived structural units is at least 50 mol % to less than 100%.

The intrinsic viscosity [η] of the polypropylene components (A) is 0.1 to 10 dl/g. The intrinsic viscosity in this range ensures that the obtainable adhesives will show excellent forming properties and mechanical strength.

The polypropylenes (A) may be produced by any methods without limitation, and established processes using known catalysts such as Ziegler-Natta catalysts and metallocene catalysts may be adopted. The polymers are preferably crystalline and, in the case of copolymers, may be random copolymers or block copolymers. The stereoregularity and molecular weight are not particularly limited as long as satisfactory forming properties are obtained and the obtainable formed products have strength enough to withstand use. Commercially available resins may be used directly.

Preferred examples of the polypropylenes (A) include homopolypropylenes and propylene/α-olefin random copolymers. A mixture of differing isotactic polypropylenes may be used. The polymers may be grafted with small amounts of monomers such as maleic anhydride. Further, the polymers may be grafted with small amounts of monomers such as maleic anhydride, and the graft monomers may be modified with diamines, carbodiimides or the like.

(B) Ethylene/Propylene/α-Olefin Copolymers

The ethylene/propylene/α-olefin copolymers (B) are defined by (i) and (ii) below. (i) The copolymers contain 45 to 90 mol % of a propylene component, 10 to 25 mol % of an ethylene component, and 1 to 30 mol % of a component derived from a C4-20 α-olefin. (ii) The intrinsic viscosity [η] measured in decalin at 135° C. is in the range of 0.1 to 10 dl/g. Preferred α-olefins include C4-10 α-olefins, and a single or two or more kinds of α-olefins having these numbers of carbon atoms may be used. Preferred proportions of the monomers are 50 to 85 mol % for propylene, 10 to 22 mol % for ethylene and 5 to 28 mol for the α-olefin, and are more preferably 55 to 80 mol % for propylene, 10 to 20 mol % for ethylene and 10 to 28 mol % for the α-olefin. As for (ii), the intrinsic viscosity [η] is preferably in the range of 0.5 to 8, and more preferably 0.8 to 6. These conditions ensure that the obtainable adhesives will have excellent balance between flexibility and mechanical strength as well as high adhesion.

The ethylene/propylene/α-olefin copolymers (B) may be produced by any methods without limitation, and established processes using known catalysts such as Ziegler-Natta catalysts and metallocene catalysts may be adopted. The stereoregularity and molecular weight are not particularly limited as long as satisfactory forming properties are obtained and the obtainable formed products have strength enough to withstand use. Commercially available resins may be used directly. As long as the above conditions are satisfied, the copolymers may be grafted with small amounts of monomers such as maleic anhydride. As long as the above conditions are satisfied, the copolymers may be grafted with small amounts of monomers such as maleic anhydride, and the graft monomers may be modified with diamines, carbodiimides or the like.

(C) Ethylene/α-Olefin Copolymers

The ethylene/α-olefin copolymer components (C) are defined by (i) and (ii) below. (i) The copolymers contain 50 to 99 mol %, of an ethylene component, and 1 to 50 mol % of a component derived from a C3-20 α-olefin. (ii) The intrinsic viscosity [η] measured in decalin at 135° C. is in the range of 0.1 to 10 dl/g. Preferred α-olefins include C3-10 α-olefins, and a single or two or more kinds of α-olefins having these numbers of carbon atoms may be used. Preferred proportions of the monomers are 55 to 98 mol % for ethylene and 2 to 45 mol % for the α-olefin, and are more preferably 60 to 95 mol % for ethylene and 5 to 40 mol % for the α-olefin. As for (ii), the intrinsic viscosity [η] is preferably in the range of 0.5 to 8, and more preferably 0.8 to 6. These conditions ensure that the obtainable adhesives will have excellent balance between flexibility and mechanical strength as well as high adhesion.

The ethylene/α-olefin copolymers (C) may be produced by any methods without limitation, and established processes using known catalysts such as Ziegler-Natta catalysts and metallocene catalysts may be adopted. The stereoregularity and molecular weight are not particularly limited as long as satisfactory forming properties are obtained and the obtainable formed products have strength enough to withstand use. Commercially available resins may be used directly. As long as the above conditions are satisfied, the copolymers may be grafted with small amounts of monomers such as maleic anhydride. As long as the above conditions are satisfied, the copolymers may be grafted with small amounts of monomers such as maleic anhydride, and the graft monomers may be modified with diamines, carbodiimides or the like.

Part of the adhesive composition is graft modified. Preferred graft monomers include unsaturated carboxylic acids and/or derivatives thereof. Examples of the unsaturated carboxylic acids and/or derivatives thereof include unsaturated compounds having one or more carboxyl groups, esters between carboxylic compounds and alkyl alcohols, and unsaturated compounds having one or more carboxylic anhydride groups. Exemplary unsaturated groups include vinyl, vinylene and unsaturated cyclic hydrocarbon groups. A single or two or more kinds of the unsaturated carboxylic acids and/or derivatives thereof may be used. Of the graft monomers, unsaturated dicarboxylic acids or acid anhydrides thereof are suitable, and maleic acid, nadic acid and acid anhydrides thereof are particularly suitable.

The content of the unsaturated carboxylic acids and/or derivatives thereof is generally 0.01 to 5 parts by weight, and preferably 0.01 to 3 parts by weight based on 100 parts by weight of the composition. When the content of the unsaturated carboxylic acids and/or derivatives thereof is in this range, the polyolefin compositions of the invention show high bond strength with respect to polyesters or ethylene/vinyl alcohol copolymers. The content of the unsaturated carboxylic acids and/or derivatives thereof may be easily controlled by appropriately selecting the grafting conditions.

<Grafting Method>

The polymers may be grafted with the graft monomers selected from the unsaturated carboxylic acids and/or derivatives thereof by any methods without limitation. Known graft polymerization methods such as solution methods and melt-kneading methods may be adopted. In an exemplary method, the polymer is molten and the graft monomer is added thereto to graft the polymer with the graft monomer. In another method, the polymer is dissolved in a solvent and the graft monomer is added to the solution to graft the polymer with the graft monomer.

<Adhesives>

The adhesives of the invention may be produced by known methods without limitation. For example, the polypropylene (A), the ethylene/propylene/α-olefin copolymer (B) and the ethylene/α-olefin copolymer (C), and optionally other components as required are collectively or successively melt-kneaded. When graft modification is performed, the components (A), (B) and (C) together are graft modified. Alternatively, part of the component (A), (B) or (C) is graft modified, and the graft modified product is melt kneaded together with the unmodified resins to give a modified polyolefin composition. In a preferred embodiment, part or the whole of the polypropylene (A) is graft modified and is melt kneaded together with the unmodified components.

For the melt kneading, the resin composition may be prepared by dry blending, followed by melt kneading with a single-screw or twin-screw extruder, a Banbury mixer, a roll or a kneader. Extruders are suitably used industrially. The temperature in the melt kneading is not particularly limited as long as the components (A), (B) and (C) are molten, but is generally in the range of 160 to 300° C., and preferably 180 to 250° C.

The adhesive resin compositions of the invention preferably have an ethylene/propylene/α-olefin ratio in n-decane-soluble components of 5-95/5-95/1-50 mol % (the total does not exceed 100 mol %). The ratio is more preferably 15-75/25-65/1-20, and still more preferably 20-60/30-60/5-15 mol % (the total does not exceed 100 mol % in each case). This ratio ensures that multilayer structures in which the adhesive resin compositions are firmly bonded to polar materials can be manufactured. Further, multilayer structures having excellent adhesion properties can be obtained even by high-speed cast film processing, stretching or extrusion coating. Furthermore, the ratio ensures that the multilayer structures are not blushed by secondary processing such as deep drawing.

The adhesive resin compositions of the invention may contain miscible resins or elastomers (e.g., high-pressure LDPE, HDPE) while still achieving the object of the invention. Such resins or elastomers may be added together with the components (A), (B) and (C), or may be mixed after the adhesive is obtained from the components (A), (B) and (C).

The adhesive resin compositions of the invention may contain known processing stabilizers, heat stabilizers, thermal aging stabilizers and fillers while still achieving the object of the invention. In particular, tackifiers are preferably added to achieve tackiness. Examples of the tackifiers include rosin derivatives, terpene resins, petroleum resins and hydrogenated products thereof, with hydrogenated terpene resins and hydrogenated petroleum resins being preferred. In the use of the tackifier, the amount of the adhesive is preferably 70 to 98% by weight and the amount of the tackifier is preferably 2 to 30% by weight.

<Multilayer Structures>

The adhesives of the invention are suitably used as adhesive layers in multilayer structures. The multilayer structures may be composed of thermoplastic resin layers such as various thermoplastic resins, for example polyolefins, polyesters, polyamides and ethylene/vinyl alcohol copolymers. Of these, ethylene/vinyl alcohol copolymers are preferably used.

The ethylene/vinyl alcohol copolymers preferably contain ethylene-derived polymer units at 20 to 50 mol %, and preferably 25 to 48 mol %. The copolymers may be produced by saponifying corresponding ethylene/vinyl acetate copolymers by conventional methods.

In a preferred embodiment of the invention, the multilayer structure comprises an ethylene/vinyl alcohol copolymer layer laminated on at least one surface of a layer formed of the adhesive polypropylene resin composition of the invention.

The multilayer structure may be produced by separately melting the composition and resin for the respective layers and laminating them on one another in a molten state. Alternatively, the multilayer structure may be manufactured by applying the adhesive in a molten state on the surface of a film or a metal pipe.

EXAMPLES

The present invention will be described in greater detail based on Examples and Comparative Examples hereinbelow without limiting the scope of the invention.

(Measurement Methods)

In Examples, properties were measured by the following methods.

[Melt Flow Rate (MFR)]

The melt flow rate was measured at 230° C. under 2.16 kg load in accordance with ASTM D 1238.

[Density]

The density was measured in accordance with JIS K 7112.

[Intrinsic Viscosity [η]]

The intrinsic viscosity [η] was measured in accordance with ASTM D 1601.

[Analysis of Monomers Composition in N-Decane-Soluble Components]

A sample was dissolved in n-decane by heating and the solution was allowed to cool to room temperature. The components that remained dissolved at this stage were n-decane-soluble components. To determine the monomers composition of the n-decane-soluble components, the solution was mixed with acetone to precipitate the-polymer component and the polymer was analyzed by IR.

(Polyolefins Used)

The following polyolefins were used in Examples and Comparative Examples. Unless otherwise specified, these were prepared by a conventional polymerization method.

Modified PP-1: modified homopolypropylene
(Maleic anhydride graft ratio=1.0 wt %, [η]=0.8)
Modified PP-2: modified homopolypropylene
(Maleic anhydride graft ratio=3.0 wt %, [η]=0.4)
PP-1: random polypropylene
(Propylene=96 mol %, ethylene=3 mol %, butene=1 mol %, [η]=2.0)

PEBR-1: ethylene/propylene/α-olefin copolymer
(Ethylene=13 mol %, propylene=68 mol %, butene=19 mol %, [η]=1.9)
EPR-1: ethylene/propylene copolymer
(Ethylene=80 mol %, propylene=20 mol %, [η]=1.9)
EPR-2: ethylene/propylene copolymer
(Ethylene=80 mol %, propylene=20 mol %, [η]=2.2)
LDPE: high-pressure low-density polyethylene
(MFR=8 g/10 min)

Example 1

(Adhesion in Cast Film)

<Production of Adhesive>

An adhesive was prepared by melt kneading 20 wt % of the modified homopolypropylene (modified PP-1) (A) having [η] of 0.8, 55 wt % of the ethylene/propylene/α-olefin copolymer (PEBR-1) (B) having [η] of 1.9, and 25 wt % of the ethylene/propylene copolymer (EPR-2) (C) having [η] of 2.2, in a single-screw extruder at 230° C. The adhesive has a melt flow rate of 5.2 g/10 min.

<Manufacturing of Three-Layer Structure>

The layers described below were coextruded under the following conditions to produce a three-layer film.

[Inner Layer]

An ethylene/vinyl alcohol copolymer (hereinafter, EVOH) (EVAL (registered trademark) F101A (MFR=1.0 g/10 min) manufactured by KURARAY CO., LTD.) was extruded at 220° C. using a screw having a diameter of 40 mm and L/D of 28.

[Outer Layer]

A commercially available polypropylene (F327D manufactured by Prime Polymer Co., Ltd., MFR=7) was extruded at 230° C. using a screw having a diameter of 50 mm and an effective length L/D of 28.

[Intermediate Layer]

The adhesive was extruded at 230° C. using a screw having a diameter of 40 mm and an effective length L/D of 28.

<Laminating Conditions>

The resins extruded to form the outer, inner and intermediate layers were laminated in the feed block in the order of the inner layer, the intermediate layer and the outer layer. The die temperature was 230° C. The multilayer structure of the resins coextruded into an approximately 70 μm thick film was taken up at 20 m/min while being cooled with a chill roll. The thicknesses of the layers were outer layer (polypropylene)/intermediate layer (adhesive)/inner layer (EVOH)=40/10/20 μm. Separately, the multilayer structure was taken up at 40 m/min, and the thicknesses of the layers in this case were outer layer (polypropylene)/intermediate layer (adhesive)/inner layer (EVOH)=20/5/10 μm. The interlayer adhesion of the multilayer structures is shown in Table 1.

<Evaluation of Adhesion of Multilayer Structure>

The multilayer structures manufactured above were cut to a width of 15 mm. The EVOH layer and the adhesive layer were separated from each other at the interface therebetween by a T-peel method using a tensile tester, and the adhesion (unit: N/15 mm) was measured at room temperature 23° C. The crosshead speed was 300 mm/min.

TABLE 1

| Formulation | Ex. 1 | Ex. 2 | Comp. Ex. 1 | Comp. Ex. 2 |
|---|---|---|---|---|
| Modified PP-1 (graft ratio = 1.0 wt %, [η] = 0.8) | 20 | 20 | 20 | 20 |
| PEBR-1 ([η] = 1.9) ethylene = 13 mol %, propylene = 68 mol %, butene = 19 mol % | 55 | 35 | — | 40 |
| EPR-2 ([η] = 2.2) ethylene = 80 mol %, propylene = 20 mol % | 25 | 25 | 25 | — |
| PP-1 ([η] = 2.0) ethylene = 3 mol %, propylene = 96 mol %, butene = 1 mol % | — | 20 | 55 | 40 |
| Total parts | 100 | 100 | 100 | 100 |
| MFR of composition [g/10 min] | 5.2 | 5.7 | 5.4 | 9.2 |
| C2/C3/α-olefin ratio | 34/53/13 | 41/48/11 | 80/20/0 | 13/68/19 |
| Peel strength [N/15 mm] (forming speed = 20 m/min) | 8.1 | 8.7 | 9.3 | 1.9 |
| Peel strength [N/15 mm] (forming speed = 40 m/min) | 4.7 | 4.9 | 1.5 | 0.5 |

Example 2 and Comparative Examples 1-2

Adhesives were prepared in the same manner as in Example 1, except that the formulations were as shown in Table 1. Table 1 sets forth the properties of the adhesives and the results of measurement and evaluation of the multilayer structures.

Example 3

Adhesion in Stretched Film

<Production of Adhesive>
An adhesive was prepared by melt kneading 75.5 wt % of the random polypropylene (PP-1) (A) having [η] of 2.0, 15 wt % of the ethylene/propylene/α-olefin copolymer (PEBR-1) (B) having [η] of 1.9, 5 wt % of the ethylene/propylene copolymer (EPR-2) (C) having [η] of 2.2, and 4.5 wt % of the modified homopolypropylene (modified PP-2) (D) having [η] of 0.4, in a single-screw extruder at 230° C. The adhesive has a melt flow rate of 7.9 g/10 min.

<Manufacturing of Five-Layer Structure>
The layers described below were coextruded under the following conditions, and a five-layer stretched film was produced.

1) Production of Five-Layer Sheet
[Outer and Inner Layers]
A commercially available polypropylene (E-233GV manufactured by Prime Polymer Co., Ltd., MFR=1) was extruded at 230° C. using a screw having a diameter of 40 mm and an effective length L/D of 28.
[Adhesive Layer]
The adhesive was extruded at 230° C. using a screw having a diameter of 40 mm and an effective length L/D of 28.
[Intermediate Layer]
An ethylene/vinyl alcohol copolymer (hereinafter, EVOH) (EVAL (registered trademark) F101B (MFR=1.0 g/10 min) manufactured by KURARAY CO., LTD.) was extruded at 220° C. using a screw having a diameter of 30 mm and L/D of 24.
[Sheet Production Conditions]
The resins extruded to form the outer, inner, adhesive and intermediate layers were laminated in the feed block in the order of the inner layer, the adhesive layer, the intermediate layer, the adhesive layer and the outer layer. The die temperature was 220° C. The multilayer structure of the resins coextruded into an approximately 850 μm thick sheet was taken up at 1 m/min while being cooled with a chill roll. The thicknesses of the layers were outer layer (polypropylene)/adhesive layer (adhesive)/intermediate layer (EVOH)/adhesive layer (adhesive)/inner layer (polypropylene)=350/50/50/50/350 μm.

2) Production of Five-Layer Stretched Film
[Production Conditions for Stretched Film]
The multilayer structure was preheated at 140° C. and biaxially stretched simultaneously to a 6-fold area at a take-up speed of 1.5 m/min. The multilayer structure was then annealed at 100° C. and cooled at room temperature. A stretched film was thus prepared. The thicknesses of the layers were outer layer (polypropylene)/adhesive layer (adhesive)/intermediate layer (EVOH)/adhesive layer (adhesive)/inner layer (polypropylene)=60/8/8/6/60 μm. The interlayer adhesion of the multilayer structure is shown in Table 2.

<Evaluation of Adhesion of Multilayer Structure>
The multilayer structure manufactured above was cut to a width of 15 mm. The EVOH layer and the adhesive layer were separated from each other at the interface therebetween by a T-peel method using a tensile tester, and the adhesion (unit: N/15 mm) was measured at room temperature 23° C. The crosshead speed was 300 mm/min.

TABLE 2

| Formulation | Ex. 3 | Comp. Ex. 3 | Comp. Ex. 4 |
|---|---|---|---|
| Modified PP-2 (graft ratio = 3.0 wt %, [η] = 0.4) | 4.5 | 4.5 | 4.5 |
| PEBR-1 ([η] = 1.9) ethylene = 13 mol %, propylene = 68 mol %, butene = 19 mol % | 15 | 10 | — |
| EPR-2 ([η] = 2.2) ethylene = 80 mol %, propylene = 20 mol % | 5 | — | 25 |

TABLE 2-continued

| Formulation | Ex. 3 | Comp. Ex. 3 | Comp. Ex. 4 |
|---|---|---|---|
| PP-1 ([η] = 2.0) ethylene = 3 mol %, propylene = 96 mol %, butene = 1 mol % | 75.5 | 85.5 | 70.5 |
| Total parts | 100 | 100 | 100 |
| MFR of composition [g/10 min] | 7.9 | 8.8 | 6.1 |
| C2/C3/α-olefin ratio | 30/56/14 | 13/68/19 | 80/20/0 |
| Peel strength after stretching [N/15 mm] | 3.9 | 2.5 | 2.8 |

Comparative Examples 3-4

Adhesives were prepared in the same manner as in Example 3, except that the formulations were as shown in Table 2. Table 2 sets forth the properties of the adhesives and the results of measurement and evaluation of the multilayer structures.

Example 4

Adhesion and Blushing Resistance of Extruded Coating Film

<Production of Adhesive>

An adhesive was prepared by melt kneading 20 wt % of the modified homopolypropylene (PP-1) (A) having [η] of 0.8, 55 wt % of the ethylene/propylene/α-olefin copolymer (PEBR-1) (B) having [η] of 1.9, and 25 wt % of the ethylene/α-olefin copolymer (EPR-1) (C) having [η] of 1.9, in a single-screw extruder at 230° C. The adhesive had a melt flow rate of 5.2 g/10 min.

<Manufacturing of Three-Layer Structure>

The layers described below were coextruded under the following conditions to produce a three-layer film.

[Outer and Adhesive Layers]

A commercially available polypropylene (F329RA manufactured by Prime Polymer Co., Ltd., MFR=24) and the adhesive were each extruded at 290° C. using a screw having a diameter of 50 mm and an effective length L/D of 28.

[Laminating Conditions]

The resins extruded to form the outer and the adhesive layers were laminated in the feed block in the order of the adhesive layer and the outer layer. The die temperature was 290° C. The multilayer structure of the resins coextruded into an approximately 40 μm thick film was brought in a molten state into contact with the surface of an aluminum foil (thickness: 20 μm), and was taken up at 50 m/min while being cooled with a chill roll having pinch rolls. The thicknesses of the layers were outer layer (polypropylene)/adhesive layer (adhesive)=20/20 μm. The interlayer adhesion of the multilayer structure is shown in Table 3.

<Evaluation of Adhesion of Multilayer Structure>

The multilayer structure manufactured above was cut to a width of 15 mm. The aluminum foil and the adhesive layer were separated from each other at the interface therebetween by a T-peel method using a tensile tester, and the adhesion (unit: N/15 mm) was measured at room temperature 23° C. The crosshead speed was 300 mm/min.

<Evaluation of Blushing Resistance after Deep Drawing>

The multilayer structure was deep drawn with a mold having a jaw depth of 5 mm, and the surface thereof was visually inspected for blushing.

TABLE 3

| Formulation | Ex. 4 | Ex. 5 | Ex. 6 | Comp. Ex. 5 | Comp. Ex. 6 |
|---|---|---|---|---|---|
| Modified PP-1 (graft ratio = 1.0 wt %, [η] = 0.8) | 20 | 20 | 20 | 20 | 20 |
| PEBR-1 ([η] = 1.9) ethylene = 13 mol %, propylene = 68 mol %, butene = 19 mol % | 55 | 35 | 30 | — | 35 |
| EPR-1 ([η] = 1.9) ethylene = 80 mol %, propylene = 20 mol % | 25 | 25 | 20 | 25 | — |
| PP-1 ([η] = 2.0) ethylene = 3 mol %, propylene = 96 mol %, butene = 1 mol % | — | 20 | 20 | 55 | 45 |
| LDPE (MFR = 8) | — | — | 10 | — | — |
| Total parts | 100 | 100 | 100 | 100 | 100 |
| MFR of composition [g/10 min] | 5.3 | 5.7 | 5.9 | 5.4 | 5.9 |
| C2/C3/α-olefin ratio | 34/53/13 | 41/48/11 | 40/49/11 | 80/20/0 | 13/68/19 |
| Peel strength [N/15 mm] | 3.4 | 2.8 | 2.5 | 0.77 | 0.89 |
| Blushing after drawn 5 mm | Absent | Absent | Absent | Present | Absent |

Examples 5-6 and Comparative Examples 5-6

Adhesives were prepared in the same manner as in Example 4, except that the formulations were as shown in Table 3. Table 3 sets forth the properties of the adhesives and the results of measurement and evaluation of the multilayer structures.

The invention claimed is:

1. An adhesive grafted resin composition for co-extrusion molding which is a grafted resin composition comprising a polypropylene component (A), an ethylene/propylene/α-olefin copolymer component (B), an ethylene/α-olefin copolymer component (C), and an unsaturated carboxylic acid and/or a derivative thereof (D), and which contains the component (A) at 5 to 80 parts by mass, the component (B) at 5 to 70 parts by mass and the component (C) at 1 to 40 parts by mass based on 100 parts by mass of the components (A), (B) and (C) combined and which has an ethylene/propylene/α-olefin ratio in n-decane-soluble components of 20-60/30-60/5-15 mol % and a graft ratio of 0.01 to 5 wt %.

2. The adhesive resin composition according to claim 1, wherein the component (B) comprises 45 to 90 mol % of a propylene component, 10 to 25 mol % of an ethylene component, and 1 to 30 mol % of a component derived from a C4-20 α-olefin.

3. The adhesive resin composition according to claim 2, wherein the component (B) has an intrinsic viscosity [η] measured in decalin at 135° C. in the range of 0.1 to 10 dl/g.

4. The adhesive resin composition according to claim 1, wherein the component (C) comprises 50 to 99 mol % of an ethylene component, and 1 to 50 mol % of a component derived from a C3-20 α-olefin.

5. The adhesive resin composition according to claim 4, wherein the component (C) has an intrinsic viscosity [η] measured in decalin at 135° C. in the range of 0.1 to 10 dl/g.

6. The adhesive resin composition according to claim 1, wherein the polypropylene component (A) has an intrinsic viscosity [η] measured in decalin at 135° C. in the range of 0.1 to 10 dl/g.

7. An adhesive comprising the adhesive resin composition of claim 1.

8. The adhesive according to claim 7, further comprising a tackifier.

9. A multilayer structure having at least one layer comprising the adhesive of claim 7.

10. The multilayer structure according to claim 9, which is produced by cast film processing at a forming speed of not less than 40 m/min.

11. The multilayer structure according to claim 9, which is stretched to at least 2-fold area during the production thereof.

12. The mutilayer structure according to claim 9, which is produced by extrusion coating.

13. A multilayer structure having at least one layer comprising the adhesive of claim 8.

* * * * *